US012619195B2

(12) United States Patent
Gong et al.

(10) Patent No.:    US 12,619,195 B2
(45) Date of Patent:          May 5, 2026

(54) IMAGE DISPLAY METHOD AND APPARATUS

(71) Applicant: Lenovo (Beijing) Limited, Beijing (CN)

(72) Inventors: Jiangtao Gong, Beijing (CN); Liuxin Zhang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 800 days.

(21) Appl. No.: 17/679,661

(22) Filed: Feb. 24, 2022

(65) Prior Publication Data

US 2023/0071571 A1      Mar. 9, 2023

(30) Foreign Application Priority Data

Sep. 6, 2021    (CN) .......................... 202111037975.8

(51) Int. Cl.
| | |
|---|---|
| *G03H 1/00* | (2006.01) |
| *A63F 13/00* | (2014.01) |
| *A63F 13/21* | (2014.01) |
| *A63F 13/25* | (2014.01) |
| *A63F 13/573* | (2014.01) |
| *A63F 13/812* | (2014.01) |
| *G03B 21/62* | (2014.01) |
| *G06F 3/01* | (2006.01) |
| *G06F 3/0484* | (2022.01) |

(52) U.S. Cl.
CPC ........... *G03H 1/0005* (2013.01); *G06F 3/011* (2013.01); *G06F 3/0484* (2013.01); *G03H*

*2001/0061* (2013.01); *G03H 2001/0088* (2013.01); *G06F 2203/04804* (2013.01)

(58) Field of Classification Search
None
See application file for complete search history.

(56) References Cited

U.S. PATENT DOCUMENTS

| | | | |
|---|---|---|---|
| 11,982,906 B1 * | 5/2024 | Tabirian ............... | G02B 5/1833 |
| 2002/0036617 A1 * | 3/2002 | Pryor ...................... | G06F 3/011 |
| | | | 345/156 |

(Continued)

FOREIGN PATENT DOCUMENTS

| | | | | | |
|---|---|---|---|---|---|
| CN | 106886289 B | * | 5/2023 | .............. | G06F 3/011 |
| TW | I394603 B | * | 5/2013 | | |

*Primary Examiner* — Hung Q Dang
(74) *Attorney, Agent, or Firm* — ANOVA LAW GROUP, PLLC

(57) ABSTRACT

An image display method includes: obtaining an input operation by a first user on a virtual interactive object displayed on a first display surface of a transparent holographic display screen; determining, in conjunction with the input operation, a movement trajectory of the virtual interactive object, a first appearance state feature of the virtual interactive object relative to an eye position of the first user, and a second appearance state feature of the virtual interactive object relative to an eye position of a second user, after a current moment; displaying the virtual interactive object having the movement trajectory and the first appearance state feature on the first display surface of the transparent holographic display screen; and displaying the virtual interactive object having the movement trajectory and the second appearance state feature on a second display surface of the transparent holographic display screen.

14 Claims, 5 Drawing Sheets

Control device

(56)                   References Cited

U.S. PATENT DOCUMENTS

| | | | |
|---|---|---|---|
| 2009/0042647 A1* | 2/2009 | Muller | A63F 13/573 |
| | | | 463/31 |
| 2010/0248833 A1* | 9/2010 | Okamura | A63F 13/57 |
| | | | 463/36 |
| 2013/0222410 A1* | 8/2013 | Kameyama | H04N 13/344 |
| | | | 345/589 |
| 2015/0227035 A1* | 8/2015 | Joseph | G03B 35/24 |
| | | | 353/121 |
| 2015/0227112 A1* | 8/2015 | Liu | H04N 13/31 |
| | | | 348/40 |
| 2016/0327729 A1* | 11/2016 | Patterson | G06F 3/041 |
| 2017/0304705 A1* | 10/2017 | Hermandorfer | A63B 69/0002 |
| 2018/0084245 A1* | 3/2018 | Lapstun | G02B 6/105 |
| 2019/0037170 A1* | 1/2019 | Zimmerman | H04N 23/73 |
| 2019/0054379 A1* | 2/2019 | Ackley | G06T 19/006 |
| 2020/0382681 A1* | 12/2020 | Smithwick | H04N 9/3194 |
| 2021/0311313 A1* | 10/2021 | Ma | G02B 27/44 |

* cited by examiner

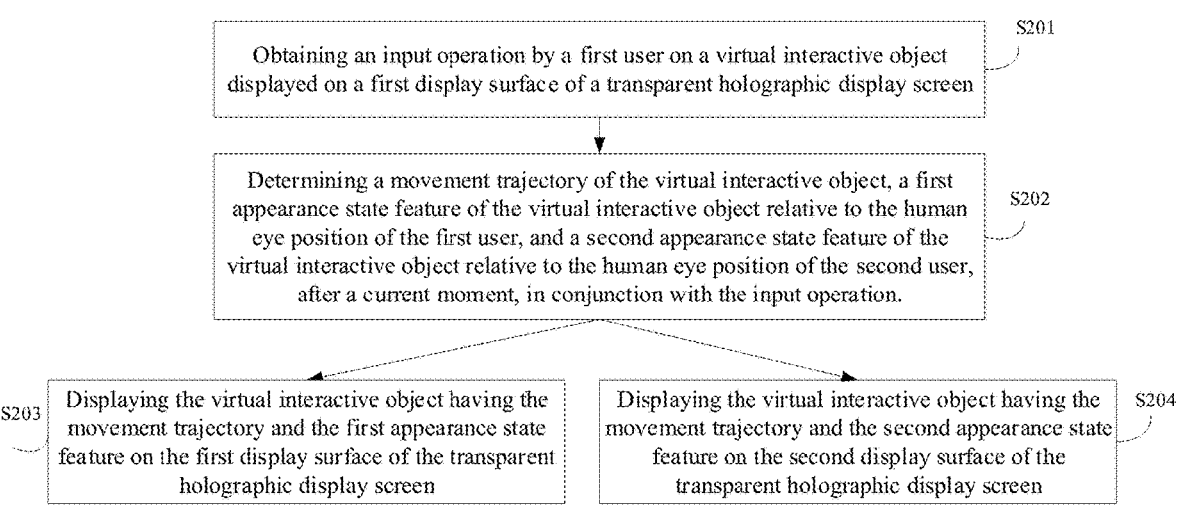

S201

Obtaining an input operation by a first user on a virtual interactive object displayed on a first display surface of a transparent holographic display screen

S202

Determining a movement trajectory of the virtual interactive object, a first appearance state feature of the virtual interactive object relative to the human eye position of the first user, and a second appearance state feature of the virtual interactive object relative to the human eye position of the second user, after a current moment, in conjunction with the input operation.

S203

Displaying the virtual interactive object having the movement trajectory and the first appearance state feature on the first display surface of the transparent holographic display screen

S204

Displaying the virtual interactive object having the movement trajectory and the second appearance state feature on the second display surface of the transparent holographic display screen

FIG. 2

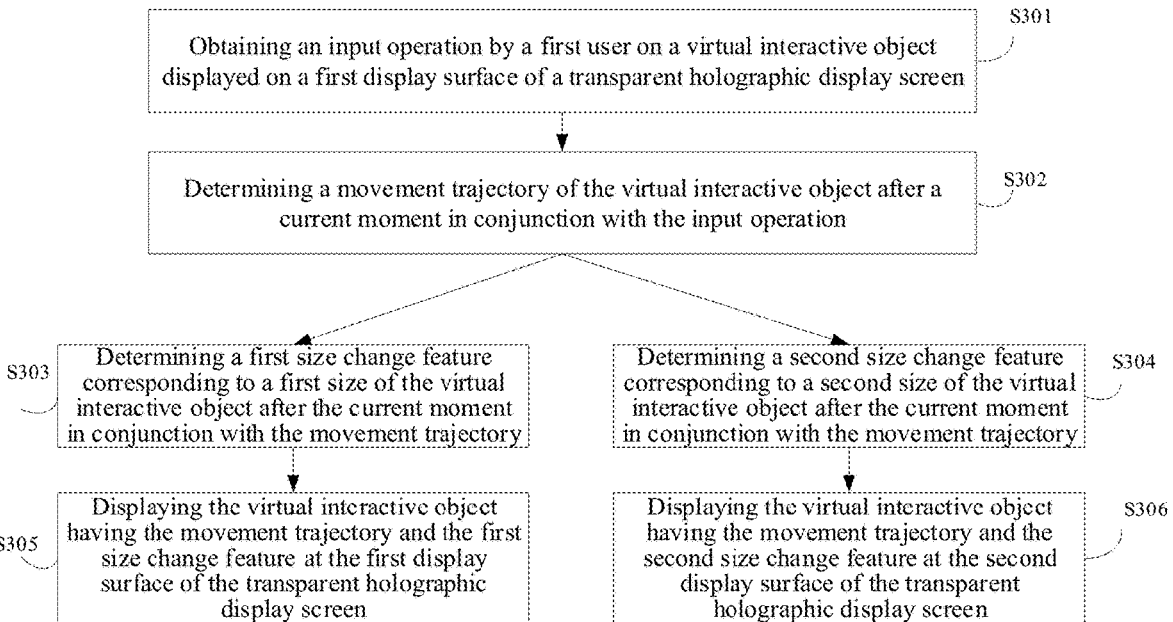

S301

Obtaining an input operation by a first user on a virtual interactive object displayed on a first display surface of a transparent holographic display screen

S302

Determining a movement trajectory of the virtual interactive object after a current moment in conjunction with the input operation

S303

Determining a first size change feature corresponding to a first size of the virtual interactive object after the current moment in conjunction with the movement trajectory

S304

Determining a second size change feature corresponding to a second size of the virtual interactive object after the current moment in conjunction with the movement trajectory

S305

Displaying the virtual interactive object having the movement trajectory and the first size change feature at the first display surface of the transparent holographic display screen

S306

Displaying the virtual interactive object having the movement trajectory and the second size change feature at the second display surface of the transparent holographic display screen

FIG. 3

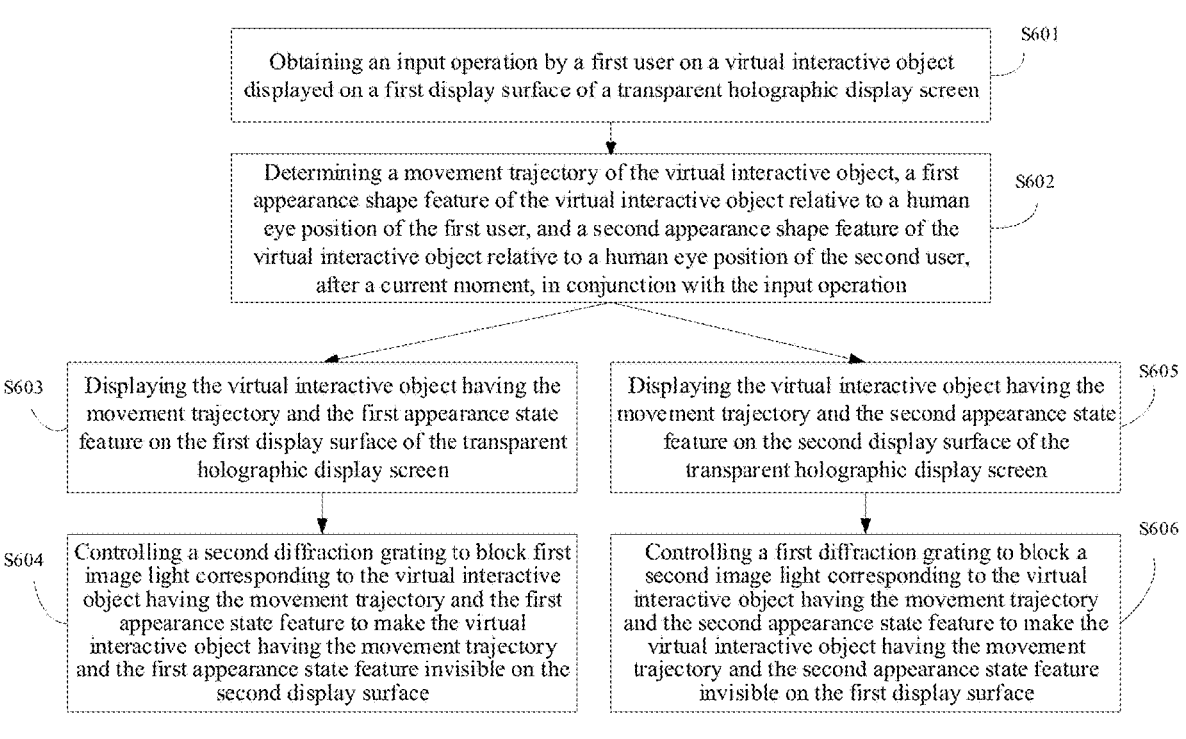

S601
Obtaining an input operation by a first user on a virtual interactive object displayed on a first display surface of a transparent holographic display screen S602
Determining a movement trajectory of the virtual interactive object, a first appearance shape feature of the virtual interactive object relative to a human eye position of the first user, and a second appearance shape feature of the virtual interactive object relative to a human eye position of the second user, after a current moment, in conjunction with the input operation S603
Displaying the virtual interactive object having the movement trajectory and the first appearance state feature on the first display surface of the transparent holographic display screen S605
Displaying the virtual interactive object having the movement trajectory and the second appearance state feature on the second display surface of the transparent holographic display screen S604
Controlling a second diffraction grating to block first image light corresponding to the virtual interactive object having the movement trajectory and the first appearance state feature to make the virtual interactive object having the movement trajectory and the first appearance state feature invisible on the second display surface S606
Controlling a first diffraction grating to block a second image light corresponding to the virtual interactive object having the movement trajectory and the second appearance state feature to make the virtual interactive object having the movement trajectory and the second appearance state feature invisible on the first display surface

FIG. 6

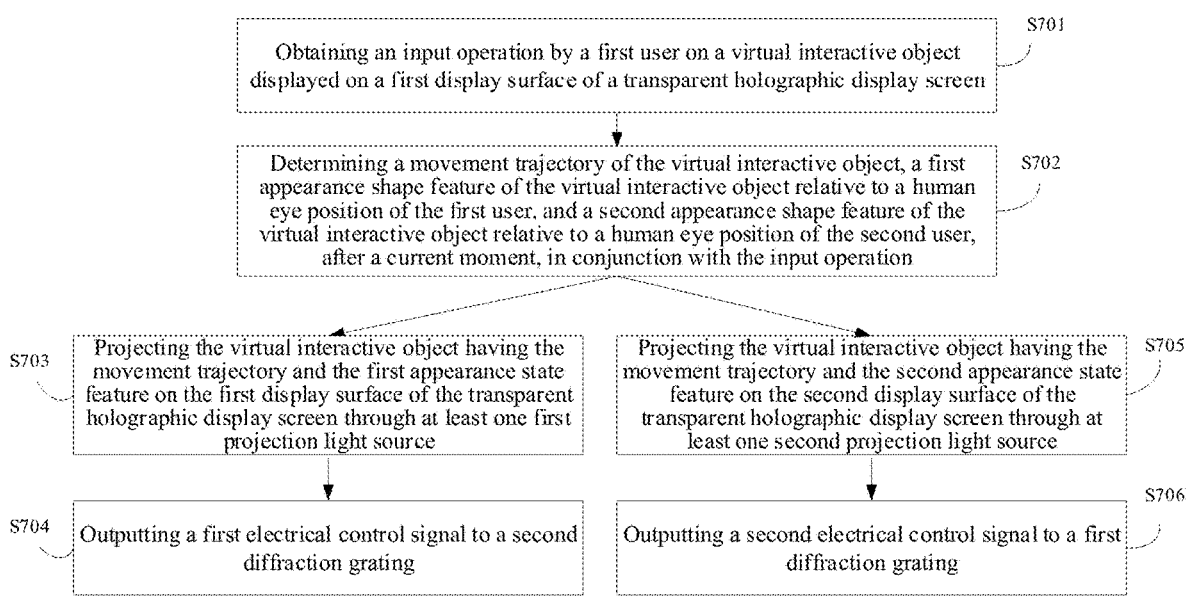

S701
Obtaining an input operation by a first user on a virtual interactive object displayed on a first display surface of a transparent holographic display screen S702
Determining a movement trajectory of the virtual interactive object, a first appearance shape feature of the virtual interactive object relative to a human eye position of the first user, and a second appearance shape feature of the virtual interactive object relative to a human eye position of the second user, after a current moment, in conjunction with the input operation S703
Projecting the virtual interactive object having the movement trajectory and the first appearance state feature on the first display surface of the transparent holographic display screen through at least one first projection light source S705
Projecting the virtual interactive object having the movement trajectory and the second appearance state feature on the second display surface of the transparent holographic display screen through at least one second projection light source S704
Outputting a first electrical control signal to a second diffraction grating S706
Outputting a second electrical control signal to a first diffraction grating

| Operation obtaining circuit | Feature determination circuit | First display control circuit | Second display control circuit |

Electronic device

902 Processor

901 Memory

903 Display circuit

904 Input circuit

IMAGE DISPLAY METHOD AND APPARATUS

CROSS-REFERENCE TO RELATED APPLICATION

This application claims priority to Chinese Patent Application No. 202111037975.8, filed on Sep. 6, 2021, the entire content of which is incorporated herein by reference.

TECHNICAL FIELD

The present disclosure relates to the technical field of display technologies and, more particularly, to an image display method and apparatus.

BACKGROUND

Application scenarios of technologies such as mixed reality increase day by day.

In the application scenarios of the mixed reality, both virtual objects and real objects are present at the same time, and a virtual scene seen by different users is the same. However, in many business scenarios, it may be desirable to be able to present different virtual scenes to users at different locations, such that the users at different locations can see more realistic virtual scenes for their perspectives.

SUMMARY

One aspect of the present disclosure provides an image projection method. The method includes: obtaining an input operation by a first user on a virtual interactive object displayed on a first display surface of a transparent holographic display screen, the first user being located at a first display surface side of the transparent holographic display screen; determining, in conjunction with the input operation, a movement trajectory of the virtual interactive object, a first appearance state feature of the virtual interactive object relative to an eye position of the first user, and a second appearance state feature of the virtual interactive object relative to an eye position of a second user, after a current moment, the second user being located at a second display surface side of the transparent holographic display screen; displaying the virtual interactive object having the movement trajectory and the first appearance state feature on the first display surface of the transparent holographic display screen; and displaying the virtual interactive object having the movement trajectory and the second appearance state feature on a second display surface of the transparent holographic display screen.

Another aspect of the present disclosure provides an electronic device. The electronic device includes a memory storing program instructions, and a processor configured to execute the program instructions to: obtain an input operation by a first user on a virtual interactive object displayed on a first display surface of a transparent holographic display screen, the first user being located at a first display surface side of the transparent holographic display screen; determine, in conjunction with the input operation, a movement trajectory of the virtual interactive object, a first appearance state feature of the virtual interactive object relative to an eye position of the first user, and a second appearance state feature of the virtual interactive object relative to an eye position of a second user, after a current moment, the second user being located at a second display surface side of the transparent holographic display screen; display the virtual interactive object having the movement trajectory and the first appearance state feature on the first display surface of the transparent holographic display screen; and display the virtual interactive object having the movement trajectory and the second appearance state feature on a second display surface of the transparent holographic display screen.

BRIEF DESCRIPTION OF THE DRAWINGS

To more clearly illustrate the technical solution of the present disclosure, the accompanying drawings used in the description of the disclosed embodiments are briefly described below. The drawings described below are merely some embodiments of the present disclosure. Other drawings may be derived from such drawings by a person with ordinary skill in the art without creative efforts and may be encompassed in the present disclosure.

FIG. 2 is a flowchart of an exemplary image display method according to some embodiments of the present disclosure;

FIG. 3 is a flowchart of another exemplary image display method according to some embodiments of the present disclosure;

FIG. 6 is a flowchart of another exemplary image display method according to some embodiments of the present disclosure;

FIG. 7 is a flowchart of another exemplary image display method according to some embodiments of the present disclosure;

DETAILED DESCRIPTION OF THE EMBODIMENTS

The terms "first," "second," "third," "fourth," etc. (if any) in the description and claims and the above-described drawings are used to distinguish similar parts and not necessarily to describe a particular order or sequence. It should be understood that data so used may be interchanged under appropriate circumstances so that the embodiments of the application described herein can be practiced in sequences other than those illustrated herein.

The embodiments of the present disclosure may be applied to scenarios such as mixed reality or augmented reality, such that more realistic virtual scene images can be presented to users located at different locations.

Embodiments of the present disclosure are described in detail below with reference to the accompanying drawings. It will be appreciated that the described embodiments are some rather than all of the embodiments of the present disclosure. Other embodiments obtained by those having ordinary skills in the art on the basis of the described embodiments without inventive efforts should fall within the scope of the present disclosure.

For convenience of comprehension, an image projection system applicable to the present disclosure and an application scenario thereof are briefly described.

Figure 1:
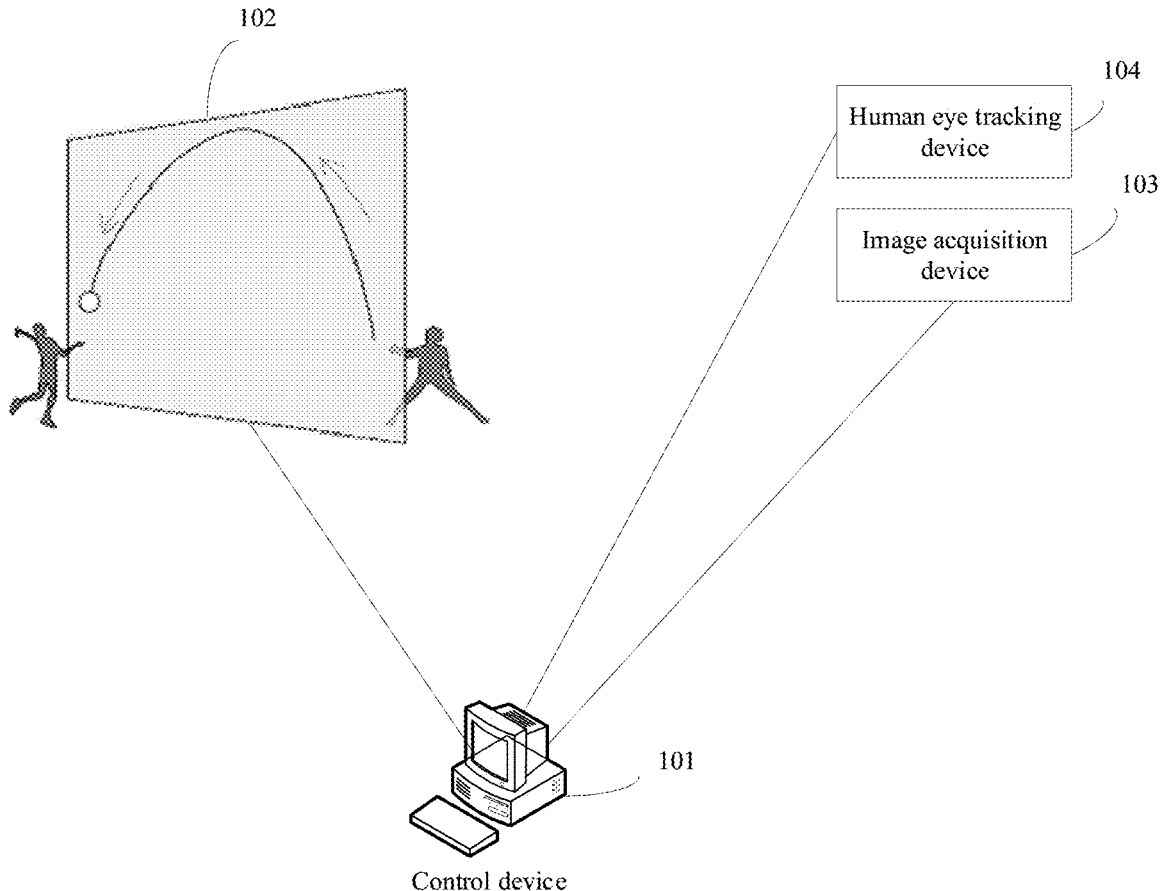
FIG. 1 is a schematic structural diagram of an exemplary image projection system according to some embodiments of the present disclosure.

FIG. 1 is a schematic structural diagram of an exemplary image projection system according to some embodiments of the present disclosure. As shown in FIG. 1, the image projection system includes a control device 101 and a transparent holographic display screen 102 coupled to the control device 101.

To project an image, the transparent holographic display screen is configured with a plurality of projection light sources. For example, the plurality of projection light sources can be organic light-emitting diodes (OLEDs) disposed inside the transparent holographic display screen. The image can be projected onto the transparent holographic display screen through light-emitting points of the OLEDs. In some embodiments, the image projection system further includes multiple projection light sources projecting toward different display surfaces of the transparent holographic display screen.

The image projection system may include one or more control devices. In case of multiple control devices, the multiple control devices form a cluster or a distributed system.

In some embodiments, the transparent holographic display screen includes two display surfaces. The two display surfaces can be two display planes of the transparent holographic display screen. Both display planes can respectively display virtual scene images. As shown in FIG. 1, the transparent holographic display screen is a flat display screen. Two sides of the flat display screen are the display surfaces. For convenience of distinction, one display surface of the transparent holographic display screen is called a first display surface, and the other display surface of the transparent holographic display screen is called a second display surface.

In some embodiments, a first user is located at the first display surface side of the transparent holographic display screen while a second user is located at the second display surface side of the transparent holographic display screen. As shown in FIG. 1, the first user located at the first display surface side of the transparent holographic display screen is preparing to perform an operation to display a virtual object on the first display surface of the transparent holographic display screen. The second user located at the second display surface side of the transparent holographic display screen is waiting for the virtual object to approach.

As such, the users located on two sides of the transparent holographic display screen may perform interactive operations based on the virtual objects in the virtual scene displayed on the transparent holographic display screen, such that the users located at different sides can interact with a same object. A shown in FIG. 1, the users located at two sides of the transparent holographic display screen can tap on a sphere in the virtual scene, such that different real-life users can have interactive experience on the same sphere in the mixed reality scene.

In one embodiment, to more accurately and comprehensively capture information such as input actions of each user or position of human eyes in the mixed reality scene or augmented reality scene where the image projection system is located, the image project system may also include one or more of an image acquisition device and a human eye tracking device. For example, the image projection system shown in FIG. 1 includes both the image acquisition device 103 and the human eye tracking device 104.

In one example, human eye position data for locating user's eye position can be collected by either the image acquisition device or the human eye tracking device, and can be reported to the control device. In another example, the human eye tracking device may obtain the human eye position data for locating the user's eye position using technologies such as infrared positioning, etc., which is not limited by the present disclosure.

Accordingly, the control device may determine the user's eye position based on the user's human eye position data.

The image acquisition device may also collect an image of the user and upload the image to the control device. Accordingly, the control device may analyze the user's image to obtain the input action by the user, such as an input instruction or specific content of an input operation.

Based on the above description, an image display method according to the present disclosure is described below with reference to flowcharts.

FIG. 2 is a flowchart of an exemplary image display method according to some embodiments of the present disclosure. The image display method can be performed by the control device in the image projection system. As shown in FIG. 2, the method includes obtaining an input operation by a first user on a virtual interactive object displayed on a first display surface of a transparent holographic display screen (S201). The first user is located at a first display surface side of the transparent holographic display screen. The virtual interactive object is a virtual object that can be operated by the user in the virtual scene presented in the transparent holographic display screen. For example, the virtual interactive object may be an item in the virtual scene that can be played by the user in a simulated real scene, or may be a virtual item created in the virtual scene that can be operated by the user, which is not limited by the present disclosure.

The input operation may be sensed by a touch sensing unit on the transparent holographic display screen, or by a user operation sensing device such as at least one image acquisition device provided by the image projection system. In addition, based on a user's action sensed by the user operation sensing device, the input operation of the user can be determined. The present disclosure does not limit specific manners of obtaining the input operation.

It can be understood that for the convenience of differentiation, one display surface of the transparent holographic display screen is called a first display surface, and another display surface is called a second display surface. Thus, the first display surface can be any display surface of the transparent holographic display screen. Accordingly, in practical applications, the embodiments of the present disclosure is applicable to a scenario where a user at any display surface of the transparent holographic display screen performs an input operation on a virtual interactive object on the display surface to which the user faces.

At S202, a movement trajectory of the virtual interactive object, a first appearance state feature of the virtual interactive object relative to the human eye position of the first user, and a second appearance state feature of the virtual interactive object relative to the human eye position of the second user, after a current moment, are determined in conjunction with the input operation.

The second user is located at the second display surface side of the transparent holographic display screen. The movement trajectory of the virtual interactive object after the current moment may be a trajectory change formed by movement positions at multiple moments after the current moment. The movement trajectory may be determined through combining parameters such as a force and a direction of the input operation on the virtual interactive object.

In one embodiment, to more accurately determine the movement trajectory of the virtual interactive object at the current moment, the present disclosure determines the movement trajectory of the virtual interactive object after the current moment through combining the input operation and a current movement state of the virtual interactive object. For example, the present disclosure determines the movement trajectory of the virtual interactive object after the current moment through combining a current movement speed and a current movement direction of the virtual interactive object, and a magnitude and a direction of the force of the input operation.

The appearance state feature of the virtual interactive object refers to an externally presented state feature of the virtual interactive object. For example, the appearance state feature of the virtual interactive object may include size, color, and shape changes of the virtual interactive object, and other features visible to naked eyes of the user.

It can be understood that, in a real scene, when a position of a same object relative to the user's human eye changes, the user may see a different appearance of the same object. For example, when the object such as an item or a person is far away from the user, the user sees the object in a small volume or size. When the object such as the item or the person is closer to the user, the user sees the object in a large volume or size. In another example, for the same object in the real scene, when the relative direction or an angle between the user and the object changes, the user sees different shapes and appearances of the object, and different patterns on an external structure of the object. In another example, for a Rubik's cube, when the user is facing a certain side of the Rubik's cube, the user sees blocks and block colors on that certain side. When the user is facing an edge of the Rubik's cube, the user sees the blocks and the block colors on two adjacent sides of the edge of the Rubik's cube.

To allow the user to see an object presentation effect consistent with an effect in the real scene through the virtual scene, the present disclosure determines the appearance state that the virtual object needs to present relative to the user's human eye position after the current moment through combining the movement trajectory of the virtual object determined based on the input operation after the current moment and the eye positions of the users located at different sides of the transparent holographic display screen.

In addition, because the eye positions of the users located at different sides of the transparent holographic display screen are different, different appearance states of the virtual object after the current moment will be determined and presented to the eye positions of the users located at different sides. The appearance state feature of the virtual interactive object relative to the user's human eye position can be construed as a change feature of the appearance state of the virtual interactive object at different moments from the perspective of the human eye position of the user.

In one embodiment, considering that the relative position of the virtual interactive object relative to the user's human eye position is related to the movement trajectory of the virtual interactive object, the present disclosure may also combine the movement trajectory of the virtual interactive object to determine the first appearance state feature of the virtual interactive object relative to the human eye position of the first user and the second appearance state feature of the virtual interactive object relative to the human eye position of the second user.

At S203, the virtual interactive object having the movement trajectory and the first appearance state feature is displayed on the first display surface of the transparent holographic display screen.

For example, in presence of the virtual interactive object, the virtual interactive object is controlled to maintain the movement trajectory and adjust the first appearance state feature thereof. For example, the movement positions of the virtual interactive object at different moments after the current moment are determined according to the movement trajectory, and a first appearance state of the virtual interactive object at different moments after the current moment is determined based on the first appearance state feature. In addition, the virtual interactive object having the corresponding movement position and the corresponding appearance state at the corresponding moment is outputted at each moment after the current moment.

There may be multiple specific manners for presenting the virtual interactive object having the movement trajectory and the first appearance state feature, which are not limited thereto.

At S204, the virtual interactive object having the movement trajectory and the second appearance state feature is displayed on the second display surface of the transparent holographic display screen.

It should be understood that to achieve the interaction between the users located at two sides of the transparent holographic display screen on the same virtual interactive object, the same virtual interactive object needs to be displayed on both display surfaces of the transparent holographic display screen. However, to simulate two or more people interacting with the same object in the real world, attributes of the same virtual interactive object outputted by the two display surfaces of the transparent holographic display screen are different. That is, the movement trajectories of the virtual interactive object outputted by the two display surfaces of the transparent holographic display screen are the same, but the appearance states thereof are different.

In some embodiments, S203 and S204 may be performed synchronously to achieve a desired synchronization effect. In some other embodiments, S203 and S204 may be performed in a sequence determined as required, which is not limited thereto.

It can be seen from the above description that after the first user performs the input operation on the virtual interactive object displayed on the first display surface of the transparent holographic display screen, the input operation is used to determine the movement trajectory of the virtual interactive object after the current moment, the first appearance state of the virtual interactive object relative to the human eye of the first user, and the second appearance state of the virtual interactive object relative to the human eye of the second user located at the other side of the transparent holographic display screen. The movement trajectory of the object is fixed in the real scene after the input operation is performed on the object. But different users at different positions relative to the object see different appearance states of the object. As such, through outputting the virtual interactive object having the same movement trajectory but different appearance states on the two display surfaces of the transparent holographic display screen, the users located at two sides of the transparent holographic display screen can see the virtual scene effect of the change feature of the object in a more realistic scene, making the virtual scene presented more in line with the real scene.

In some embodiments, the appearance state feature of the virtual interactive object may take various shapes and forms. For convenience of understanding, the image display method according to the present disclosure is described below using several possible examples of the appearance state feature.

FIG. 3 is a flowchart of another exemplary image display method according to some embodiments of the present disclosure. The image display method may be performed by the above-described control device. As shown in FIG. 3, the method includes the following processes.

At S301, an input operation by a first user on a virtual interactive object displayed on a first display surface of a transparent holographic display screen is obtained. The first user is located at a first display surface side of the transparent holographic display screen.

At S302, a movement trajectory of the virtual interactive object after a current moment is determined in conjunction with the input operation.

For this process, reference may be made to related description for determining the movement trajectory, which will not be repeated herein.

At S303, a first size change feature corresponding to a first size of the virtual interactive object after the current moment is determined in conjunction with the movement trajectory.

The first size is a size of the virtual interactive object relative to the human eye position of the first user, that is, a size of the virtual interactive object from the perspective of eyes of the first user. The first size change feature may include the first size for at least one moment after the current moment, or may include a change trend or a change rule of the first size after the current moment.

In some embodiments, for a same object in the real scene, the closer the object is to the user, the larger the size of the object seen by the human eyes. On the other hand, the farther the relative distance is, the smaller the size of the object is. Thus, to make the virtual interactive object in the virtual scene show the corresponding size change feature in the real scene relative to the human eye position of the first user, the farther a distance of the virtual interactive object relative to the user's human eye position is, the smaller the size of the virtual interactive object relative to the user's human eye is.

In one embodiment, a corresponding relationship between different distances and sizes of the virtual interactive object relative to the user's human eye may be configured. The larger the distance of the virtual interactive object relative to the user's human eye in the corresponding relationship, the smaller the corresponding size. Thus, through querying the corresponding relationship, the first size change feature of the virtual interactive object along with the change of the movement trajectory of the virtual interactive object can be determined.

At S304, a second size change feature corresponding to a second size of the virtual interactive object after the current moment is determined in conjunction with the movement trajectory.

The second size is a size of the virtual interactive object relative to the human eye position of the second user, that is, a size of the virtual interactive object from the perspective of eyes of the second user.

The second size change feature may include the second size for at least one moment after the current moment, or may include a change trend or a change rule of the second size after the current moment. The farther the distance of the virtual interactive object relative to the human eye position of the second user, the smaller the size of the virtual interactive object relative to the human eye position of the second user.

The specific manner of determining the second size change feature based on the movement trajectory is similar to the foregoing process of determining the first size change feature, and details are not repeated herein.

At S305, the virtual interactive object having the movement trajectory and the first size change feature is displayed at the first display surface of the transparent holographic display screen.

At S306, the virtual interactive object having the movement trajectory and the second size change feature is displayed at the second display surface of the transparent holographic display screen.

For S305 and S306, reference may be made to the related description of previous embodiments, and details are not repeated herein.

For convenience of understanding the embodiment shown in FIG. 3, a mixed reality scene consistent with the present disclosure is described below.

Figure 4:
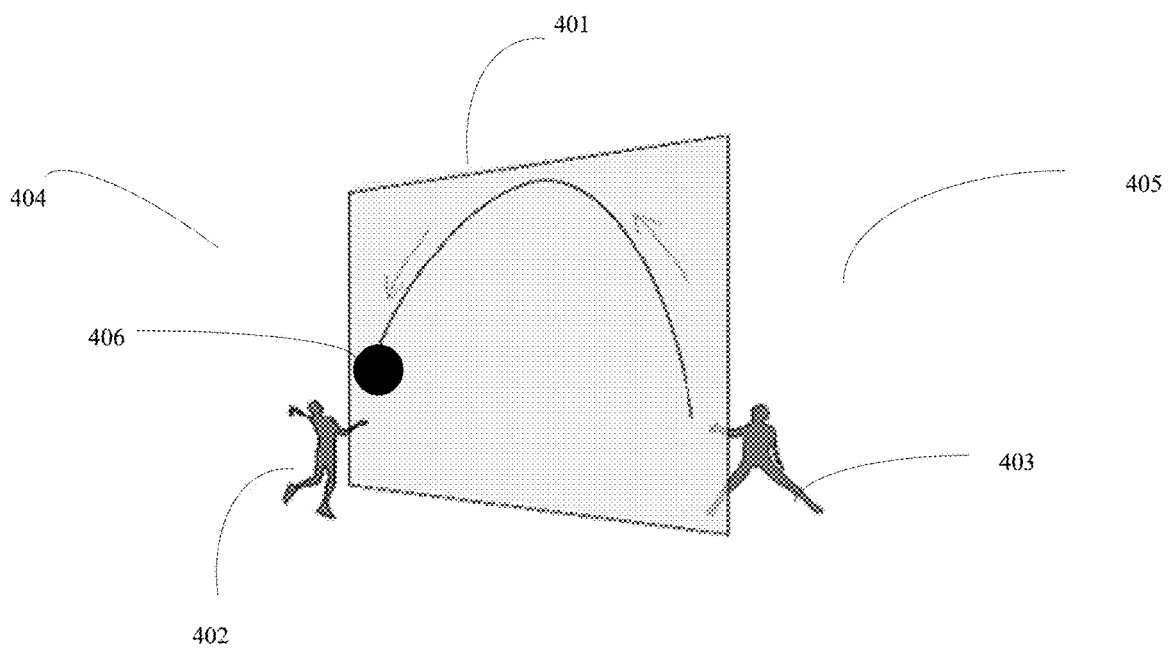
FIG. 4 is a schematic diagram illustrating an exemplary mixed reality scene according to some embodiments of the present disclosure.
Figure 5:
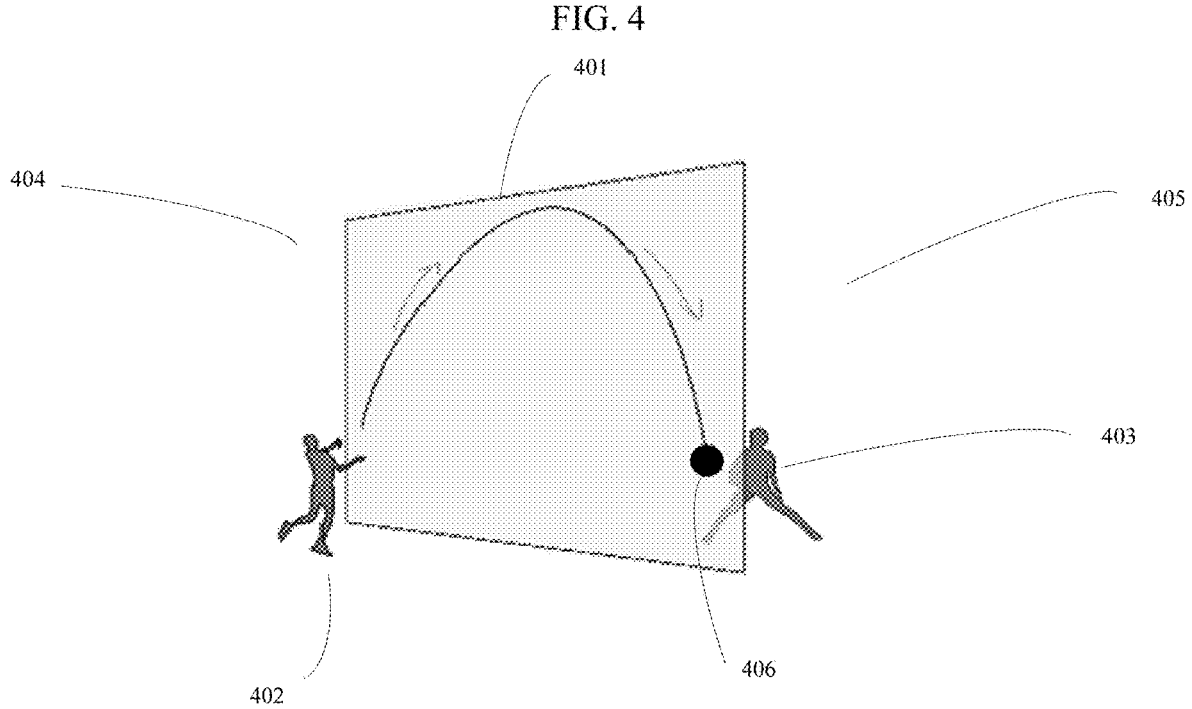
FIG. 5 is a schematic diagram illustrating another exemplary mixed reality scene according to some embodiments of the present disclosure.

FIG. 4 and FIG. 5 are schematic diagrams illustrating exemplary mixed reality scenes in which users on two sides of the transparent holographic display screen play a ball using a virtual scene displayed by the transparent holographic display screen. As shown in FIG. 4 and FIG. 5, the mixed reality scene includes a transparent holographic display screen 401, a first user 402, and a second user 403. The first user 401 and the second user 403 are located at two sides of the transparent holographic display screen. As shown in FIG. 4 and FIG. 5, the first user 402 is located in an area 404 at the first display surface side of the transparent holographic display screen, and the second user 403 is located in an area 405 at the second display surface side of the transparent holographic display screen.

Because the image in the virtual scene is displayed on both the first display surface and the second display surface of the transparent holographic display screen, both the first display surface and the second display surface display a virtual ball. However, showing a view from one perspective, FIG. 4 and FIG. 5 only display the image of the virtual ball 406 on the first display surface.

As shown in FIG. 4, the virtual ball 406 displayed on the first display surface is relatively close to the first user 402. Compared to FIG. 5, because the virtual ball 406 displayed in FIG. 4 is closer to the first user 402, the size of the virtual ball 406 is relatively larger.

In some embodiments, at the moment corresponding to FIG. 4, the virtual ball 406 is also displayed on the second display surface, and a relative position of the virtual ball 406 displayed on the second display surface relative to the transparent holographic display screen is the same as a relative position of the virtual ball 406 displayed on the first display surface relative to the transparent holographic display screen. Based on the above description, according to the position of the second user, the virtual ball 406 on the second display surface is farther from the human eye position of the second user. Thus, the size of the virtual ball 406 on the second display surface is substantially smaller than the size of the virtual ball 406 on the first display surface.

In the mixed reality scene shown in FIG. 4, after the first user hits the virtual ball 406 on the first display surface, the virtual ball 406 will move continuously along a parabolic movement trajectory from left to right. At the same time, because the distance of the virtual ball 406 relative to the human eye position of the first user is constantly changing, a diameter of the virtual ball 406 becomes smaller and smaller. As shown in FIG. 5, when the virtual ball 406 on the first display surface moves from a position closer to the first user to a position closer to the second user, the size of the virtual ball 406 becomes substantially smaller than the size in FIG. 4, such that from the first user's viewing angle, the virtual ball 406 is getting smaller and smaller as it is getting farther and farther away from the first user. Thus, from the first user's viewing angle, a realistic effect is perceived that as the real ball moves away gradually, the size of the real ball becomes smaller gradually.

Similarly, the movement trajectory of the virtual ball on the second display surface is consistent with the movement trajectory of the virtual ball on the first display surface. The size of the virtual ball on the second display surface gradually increases as the virtual ball moves along the movement trajectory. From the second user's viewing angle, as the virtual ball gradually approaches the second user, the size of the virtual ball gradually increases.

In one embodiment, the appearance state feature of the virtual interactive object may be a color feature of the virtual interactive object. In this case, the movement trajectory of the virtual interactive object after the current moment can be determined first in conjunction with the input operation.

Correspondingly, a first color change feature of a first color of the virtual interactive object after the current moment is determined in conjunction with the movement trajectory. The first color is a color that the virtual interactive object needs to present to the human eye position of the first user. For example, the first color change feature may include the first color of at least one moment after the current moment or a first color change rule after the current moment. The farther the distance of the virtual interactive object relative to the human eye position of the first user, the lighter the first color that the virtual interactive object needs to present.

Similarly, in conjunction with the movement trajectory, a second color change feature of a second color that the virtual interactive object needs to present after the current moment can be determined. The second is a color that the virtual interactive object needs to present relative to the human eye position of the second user. The farther the distance of the virtual interactive object relative to the human eye position of the second user, the lighter the second color that the virtual interactive object needs to present.

It should be understood that the above description is based on two possible examples of the appearance state feature. In practical applications, the appearance state feature may be in other shapes and forms, and details thereof will not be described herein.

It should be noted that, in practical applications, the appearance state feature may simultaneously include multiple variations. For example, the first appearance state feature may simultaneously include the first size change feature and the first color change feature. Correspondingly, the virtual interactive object having the movement trajectory, the first size change feature, and the first color change feature may be displayed on the first display surface of the transparent holographic display screen.

Similarly, the second appearance state feature may simultaneously include the second size change feature and the second color change feature. Correspondingly, the virtual interactive object having the movement trajectory, the second size change feature, and the second color change feature may be displayed on the second display surface of the transparent holographic display screen.

In some embodiments, under the circumstance that both display surfaces of the transparent holographic display screen simultaneously display different virtual scene images, to reduce mutual interference of contents displayed on the two display surfaces, a first diffraction grating may be superimposed on the first display surface of the transparent holographic display screen, and a second diffraction grating may be superimposed on the second display surface of the transparent holographic display screen. The diffraction grating is a type of grating with a periodic structure that causes at least one of an amplitude or a phase of an incident light to undergo periodic spatial modulation. Because slits in the diffraction grating are small and dense, even if the diffraction grating is superimposed on the display surface of the transparent holographic display screen, the diffraction grating is invisible from the user's viewing angle.

In the embodiments of the present disclosure, the diffraction grating superimposed on the display surface of the transparent holographic display screen can be a controllable diffraction grating. Thus, light diffraction in different grating regions of the diffraction grating can be controlled and changed, thereby changing a light transmittance of a corresponding grating region.

Based on the above description, by controlling the two diffraction gratings, the control device may better display different virtual scene images on the first display surface and the second display surface, respectively.

FIG. 6 is a flowchart of another exemplary image display method according to some embodiments of the present disclosure. As shown in FIG. 6, the image display method includes the following processes.

At S601, an input operation by a first user on a virtual interactive object displayed on a first display surface of a transparent holographic display screen is obtained. The first user is located at a first display surface side of the transparent holographic display screen.

At S602, a movement trajectory of the virtual interactive object, a first appearance state feature of the virtual interactive object relative to a human eye position of the first user, and a second appearance state feature of the virtual interactive object relative to a human eye position of the second user, after a current moment, are determined in conjunction with the input operation.

At S603, the virtual interactive object having the movement trajectory and the first appearance state feature is displayed on the first display surface of the transparent holographic display screen.

For S601 through S603, reference may be made to the related description of the previous embodiments, and details are not repeated herein.

At S604, a second diffraction grating is controlled to block first image light corresponding to the virtual interactive object having the movement trajectory and the first appearance state feature to make the virtual interactive object having the movement trajectory and the first appearance state feature invisible on the second display surface.

For convenience of differentiation, an image light (also referred to as a projection light) corresponding to the virtual interactive object having the movement trajectory and the first appearance state feature projected by the control device on the first display surface of the transparent holographic display screen is called the first image light. Correspondingly, an image light corresponding to the virtual interactive object having the movement trajectory and the second appearance state feature is called second image light.

In some embodiments, because the second diffraction grating is used to block the first image light, the first image light is invisible to the user located at the second display surface side, who naturally cannot see the virtual interactive object having the movement trajectory and the first appearance state feature. In some embodiments, the diffraction gratings may be controllable diffraction gratings, and correspondingly variations are described below.

In one embodiment, the first diffraction grating and the second diffraction grating are diffraction gratings with adjustable grating spacing. For example, the grating spacing of the first diffraction grating and the second diffraction grating can be mechanically adjusted. In this case, the control device may send a first electrical control signal to the second diffraction grating. The first electrical control signal may be a control instruction for instructing the second diffraction grating to adjust the grating spacing in a first sub-grating area covered by the first image light until reaching a light blocking state.

In another embodiment, the second diffraction grating is a diffraction grating with a controllable diffraction coefficient. Correspondingly, in the embodiments above, the first electrical control signal may be used to control the diffraction coefficient of at least one first sub-diffraction area in the second diffraction grating to be a diffraction coefficient corresponding to the light blocking state.

For example, the second diffraction grating is an electrically controllable diffraction grating. By adjusting a driving voltage applied to different diffraction areas of the second diffraction grating, the diffraction coefficient of the corresponding diffraction areas can be adjusted. Based on the above description, the control device may send the first electrical control signal to the second diffraction grating, and the first electrical control signal is a target driving voltage for controlling at least one first sub-grating area in the second diffraction grating. When the target driving voltage is applied to the first sub-grating area, the diffraction coefficient of the first sub-grating area is the diffraction coefficient corresponding to the light blocking state. The first sub-grating area may be an area covered by the first image light in the second diffraction grating.

Of course, the above is an example of one implementation method for adjusting the diffraction coefficient of the electrically controllable diffraction grating. In practical applications, there are other variations for adjusting the diffraction coefficient of the electrically controllable diffraction grating, which are not limited thereto.

It should be noted that, in practical applications, the sequence of S603 and S604 is not limited to FIG. 6. In practical applications, to better keep privacy of the content presented on the first display surface and to avoid interfering the image displayed on the second display surface, S603 and S604 may be performed concurrently.

At S605, the virtual interactive object having the movement trajectory and the second appearance state feature is displayed on the second display surface of the transparent holographic display screen.

For this process, reference may be made to the related description of previous embodiments, and details are not repeated herein.

At S606, a first diffraction grating is controlled to block second image light corresponding to the virtual interactive object having the movement trajectory and the second appearance state feature to make the virtual interactive object having the movement trajectory and the second appearance state feature invisible on the first display surface.

Similar to S604, because the first diffraction grating is used to block the second image light, the second image light is invisible to the user located at the first display surface side, who naturally cannot see the virtual interactive object having the movement trajectory and the second appearance state feature. There may be multiple specific manners to control the first diffraction grating. In one embodiment, the first diffraction grating may be a diffraction grating with adjustable grating spacing. For example, the grating spacing of the first diffraction grating can be mechanically adjusted. In this case, the control device may send a second electrical control signal to the first diffraction grating. The second electrical control signal may be a control instruction for instructing the first diffraction grating to adjust the grating spacing in a second sub-grating area until reaching the light blocking state. There may be one or more second sub-grating areas of the first diffraction grating, and the second sub-grating areas are grating areas in the first diffraction grating covered by the second image light.

In another embodiment, the first diffraction grating is a diffraction grating with a controllable diffraction coefficient. Correspondingly, the control device sends the second electrical control signal to the first diffraction grating. The second electrical control signal may be used to control the diffraction coefficient of at least one second sub-diffraction area in the first diffraction grating to be a diffraction coefficient corresponding to the light blocking state.

It should be noted that S605 and S606 may be performed concurrently to make the virtual interactive object on the second display surface invisible on the first display surface.

In the embodiments of the present disclosure, to project different virtual scene images to the first display scene and the second display scene respectively, different projection devices may be selected from a plurality of projection devices to perform image projection according to the display surface that needs to be projected.

FIG. 7 is a flowchart of another exemplary image display method according to some embodiments of the present disclosure. As shown in FIG. 7, the image display method includes the following processes.

At S701, an input operation by a first user on a virtual interactive object displayed on a first display surface of a transparent holographic display screen is obtained. The first user is located at a first display surface side of the transparent holographic display screen.

At S702, a movement trajectory of the virtual interactive object, a first appearance state feature of the virtual interactive object relative to a human eye position of the first user, and a second appearance state feature of the virtual interactive object relative to a human eye position of the second user, after a current moment, are determined in conjunction with the input operation.

At S703, the virtual interactive object having the movement trajectory and the first appearance state feature is projected on the first display surface of the transparent holographic display screen through at least one first projection light source.

In some embodiments, the at least one first projection light source is disposed inside the transparent holographic display screen or facing toward the transparent holographic display screen. The at least one first projection light source belongs to a plurality of projection light source disposed inside the transparent holographic display screen or in the scene where the image projection system is located, and belongs to projection light sources capable of projecting images on the first display surface. For example, the at least one first projection light source of which a light projection direction faces the first display surface can be selected in conjunction with light projection directions of the plurality of projection light sources in the image projection system.

At S704, a first electrical control signal is outputted to a second diffraction grating.

In some embodiments, the first electrical control signal is configured to control a first sub-grating area in the second diffraction grating in a light projection area of the at least one first projection light source in a light blocking state.

For the specific manner in which the first electrical control signal controls the first sub-grating area to be in the light blocking state, reference can be made to the related description in the previous embodiments, and details are not repeated herein.

At S705, the virtual interactive object having the movement trajectory and the second appearance state feature is projected on the second display surface of the transparent holographic display screen through at least one second projection light source.

In some embodiments, the at least one second projection light source is disposed inside the transparent holographic display screen or facing toward the transparent holographic display screen. The at least one second projection light source belongs to a plurality of projection light source disposed inside the transparent holographic display screen or in the scene where the image projection system is located, and belongs to projection light sources capable of projecting images on the second display surface. For example, the at least one second projection light source of which a light projection direction faces the second display surface can be selected in conjunction with light projection directions of the plurality of projection light sources in the image projection system.

At S706, a second electrical control signal is outputted to a first diffraction grating.

In some embodiments, the second electrical control signal is configured to control a second sub-grating area in the first diffraction grating in a light projection area of the at least one second projection light source in the light blocking state.

For the specific manner in which the second electrical control signal controls the second sub-grating area to be in the light blocking state, reference can be made to the related description in the previous embodiments, and details are not repeated herein.

Figure 8:
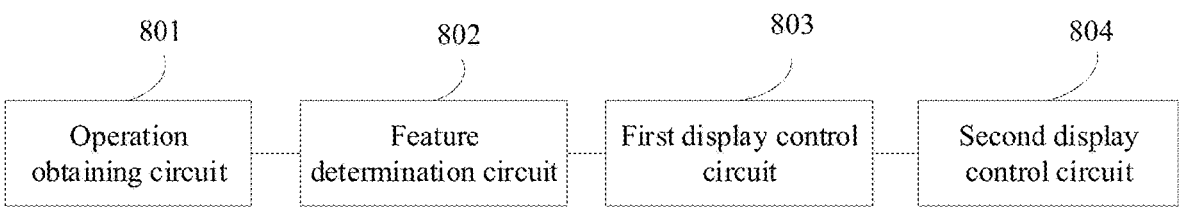
FIG. 8 is a schematic structural diagram of an exemplary image display apparatus according to some embodiments of the present disclosure.

Corresponding to the image display method of the present disclosure, the present disclosure also provides an image display apparatus. FIG. 8 is a schematic structural diagram of an exemplary image display apparatus according to some embodiments of the present disclosure. As shown in FIG. 8, the image display apparatus includes an operation obtaining circuit 801, a feature determination circuit 802, a first display control circuit 803, and a second display control circuit 804.

The operation obtaining circuit 801 is configured to obtain an input operation of a first user on a virtual interactive object displayed on a first display surface of a transparent holographic display screen. The first user is located at a first display surface side of the transparent holographic display screen.

The feature determination circuit 802 is configured to determine, in conjunction with the input operation, a movement trajectory of the virtual interactive object, a first appearance state feature of the virtual interactive object relative to an eye position of the first user, and a second appearance state feature of the virtual interactive object relative to an eye position of a second user. The second user is located at a second display surface side of the transparent holographic display screen.

The first display control circuit 803 is configured to project the virtual interactive object having the movement trajectory and the first appearance state feature on the first display surface of the transparent holographic display screen.

The second display control circuit 804 is configured to project the virtual interactive object having the movement trajectory and the second appearance state feature on the second display surface of the transparent holographic display screen.

In one embodiment, the feature determination circuit 802 includes a trajectory determination circuit configured to determine the movement trajectory of the virtual interactive object after the current moment in conjunction with the input operation, a first size determination circuit configured to determine the first size change feature corresponding to the first size of the virtual interactive object after the current moment in conjunction with the movement trajectory, and a second size determination circuit configured to determine the second size change feature corresponding to the second size of the virtual interactive object after the current moment in conjunction with the movement trajectory. The first size is a size of the virtual interactive object relative to the eye position of the first user, that is, a size of the virtual interactive object from the perspective of eyes of the first user. The first size is smaller in response to the virtual interactive object being farther away from the eye position of the first user. The second size is a size of the virtual interactive object relative to the eye position of the second user, that is, a size of the virtual interactive object from the perspective of eyes of the second user. The second size is smaller in response to the virtual interactive object being farther away from the eye position of the second user.

In one embodiment, the feature determination circuit 802 further includes a first color determination circuit configured to determine a first color change feature of a first color of the virtual interactive object after the current moment in conjunction with the movement trajectory, and a second color determination circuit configured to determine a second color change feature of a second color of the virtual interactive object after the current moment in conjunction with the movement trajectory. The first color is a color that the virtual interactive object needs to present to the eye position of the first user. The first color is lighter in response to the virtual interactive object being farther away from the eye position of the first user. The second color is a color that the virtual interactive object needs to present to the eye position of the second user. The second color is lighter in response to the virtual interactive object being farther away from the eye position of the second user.

In one embodiment, a first diffraction grating may be superimposed on the first display surface of the transparent holographic display screen, and a second diffraction grating may be superimposed on the second display surface of the transparent holographic display screen. The image display apparatus further includes a first grating control circuit configured to control the second diffraction grating to block first image light corresponding to the virtual interactive object having the movement trajectory and the first appearance state feature to make the virtual interactive object having the movement trajectory and the first appearance state feature invisible on the second display surface, and a second grating control circuit configured to control the first diffraction grating to block second image light corresponding to the virtual interactive object having the movement trajectory and the second appearance state feature to make the virtual interactive object having the movement trajectory and the second appearance state feature invisible on the first display surface.

In one embodiment, the image display apparatus further includes a first display control circuit configured to project the virtual interactive object having the movement trajectory and the first appearance state feature on the first display surface of the transparent holographic display screen through at least one first projection light source. The at least one first projection light source is disposed inside the transparent holographic display screen or facing toward the transparent holographic display screen. The first grating control circuit is further configured to output a first electrical control signal to the second diffraction grating. The first electrical control signal is configured to control a first sub-grating area in the second diffraction grating in a light projection area of the at least one first projection light source to be in a light blocking state.

In one embodiment, the image display apparatus further includes a second display control circuit configured to project the virtual interactive object having the movement trajectory and the second appearance state feature on the second display surface of the transparent holographic display screen through at least one second projection light source. The at least one second projection light source is disposed inside the transparent holographic display screen or facing toward the transparent holographic display screen. The second grating control circuit is further configured to output a second electrical control signal to the first diffraction grating. The second electrical control signal is configured to control a second sub-grating area in the first diffraction grating in a light projection area of the at least one second projection light source to be in a light blocking state.

Figure 9:
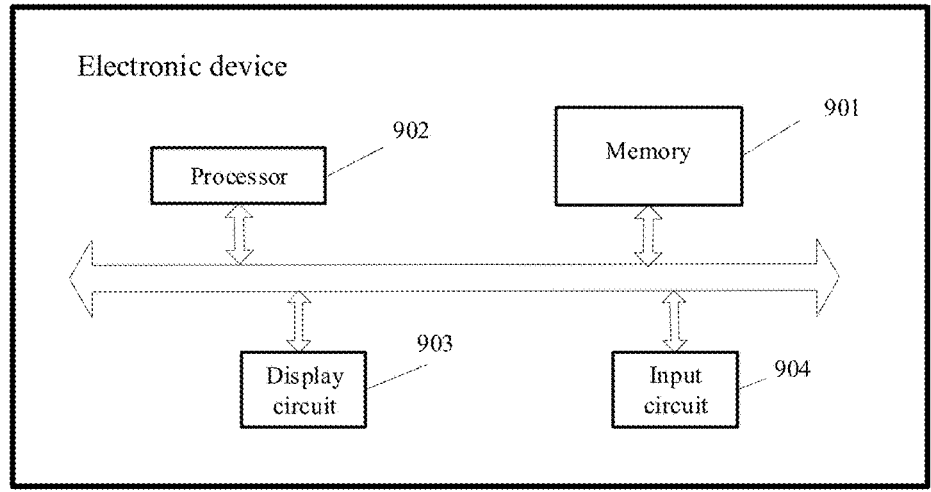
FIG. 9 is a schematic structural diagram of an exemplary electronic device according to some embodiments of the present disclosure.

The present disclosure also provides an electronic device. FIG. 9 is a schematic structural diagram of an exemplary electronic device according to some embodiments of the present disclosure. The electronic device may be any type of electronic device. As shown in FIG. 9, the electronic device includes at least a memory 901 and a processor 902. The processor 901 is configured to perform the image display method in any one of the above-described embodiments. The memory 902 is used to store programs required by the processor to perform operations.

The memory 901 can include a volatile memory, such as a random-access memory (RAM), and/or a non-volatile memory among computer-readable storage media, such as a read only memory (ROM) or a flash memory (flash RAM). The memory 901 includes at least one memory chip.

In some embodiments, the electronic device further includes a display 903 and an input device 904. In some other embodiments, the electronic device may include more or less components shown in FIG. 9, which are not limited thereto.

The present disclosure also provides a computer-readable storage medium. The computer-readable storage medium stores at least one instruction, at least one section of a program, a code set or an instruction set. The at least one instruction, at least one section of the program, the code set or the instruction set will be loaded and executed by a processor to implement the image display method described in any one of the above-described embodiments.

The present disclosure also provides a computer program. The computer program includes computer instructions. The computer instructions may be stored in the computer-readable storage medium. The computer program is executed by an electronic device to perform the image display method described in any one of the above-described embodiments.

Various embodiments in the specification are described in a progressive manner, and each embodiment focuses on the differences from other embodiments, and for the same and similar parts between the various embodiments, reference can be made to each other. At the same time, the features described in the embodiments in the specification may be replaced or combined with each other, such that those skilled in the art can realize or use the present disclosure. As for the devices disclosed in the embodiments, because of the correspondence to the method disclosed in the embodiments, the description is relatively simple, and reference can be made to the description of the method for relevant parts.

It should also be noted that in the specification, relational terms such as first and second are used only to distinguish one entity or operation from another, and do not necessarily require or imply that there is such actual relationship or order between those entities or operations. Moreover, the terms "comprising," "including" or any other variation thereof are intended to encompass non-exclusive inclusion such that a process, method, article or device comprising a list of elements includes not only those elements, but also includes not explicitly listed or other elements inherent to such a process, method, article or apparatus. Without further limitation, an element qualified by the phrase "comprising a . . . " does not preclude the presence of additional identical elements in a process, method, article or apparatus that includes the element.

Those skilled in the art can further realize that the units and algorithm processes of the examples described in the embodiments disclosed in the specification can be implemented by electronic hardware, computer software, or a combination of both. To clearly illustrate interchangeabilities of hardware and software, the structures and processes of each example have been generally described in the specification in accordance with the functions. Whether these functions are implemented by hardware or software depends on the specific application and design constraints of the technical solution. Those skilled in the art can use different methods for each specific application to implement the described functions, but such implementation should not be considered beyond the scope of this application.

The processes of the method or algorithm described in the embodiments disclosed in the specification can be directly implemented by hardware, a software module executed by a processor, or a combination thereof. The software module can be stored in random access memory (RAM), internal memory, read-only memory (ROM), electrically programmable ROM, electrically erasable programmable ROM, registers, hard disks, removable disks, CD-ROMs, or any other storage media known in the technical field.

The above description of the disclosed embodiments enables those skilled in the art to implement or use this application. Various modifications to these embodiments will be obvious to those skilled in the art, and the general principles defined herein can be implemented in other embodiments without departing from the spirit or scope of the present application. Therefore, this application will not be limited to the embodiments shown in the specification, but should conform to the broadest scope consistent with the principles and novelties disclosed in the specification.

What is claimed is:

1. An image display method comprising:
obtaining an input operation by a first user on a virtual interactive object displayed on a first display surface of a transparent holographic display screen, the first user being located at a first display surface side of the transparent holographic display screen;
determining, in conjunction with the input operation, a movement trajectory of the virtual interactive object, a first appearance state feature of the virtual interactive object relative to an eye position of the first user, and a second appearance state feature of the virtual interactive object relative to an eye position of a second user, after a current moment, the second user being located at a second display surface side of the transparent holographic display screen, the movement trajectory being determined through combining a current movement speed and a current movement direction of the virtual interactive object, and a magnitude and a direction of a force of the input operation on the virtual interactive object, wherein a size change feature corresponding to an apparent size of the virtual interactive object is determined as the virtual interactive object moves along the movement trajectory based on a preconfigured correspondence relationship defining correspondences between a plurality of different apparent sizes of the virtual interactive object and a plurality of different distances of the virtual interactive object relative to a user's eyes, and the determining the size change feature comprises querying the preconfigured correspondence relationship using a distance between the virtual interactive object and the user's eyes;

displaying the virtual interactive object having the movement trajectory and the first appearance state feature on the first display surface of the transparent holographic display screen; and displaying the virtual interactive object having the movement trajectory and the second appearance state feature on a second display surface of the transparent holographic display screen.

2. The method according to claim 1, wherein determining the movement trajectory, the first appearance state feature, and the second appearance state feature after the current moment includes:

determining the movement trajectory of the virtual interactive object after the current moment in conjunction with the input operation;

determining a first size change feature corresponding to a first size of the virtual interactive object after the current moment in conjunction with the movement trajectory, the first size being a size of the virtual interactive object relative to the eye position of the first user and being smaller in response to the virtual interactive object being farther away from the eye position of the first user; and determining a second size change feature corresponding to a second size of the virtual interactive object after the current moment in conjunction with the movement trajectory, the second size being a size of the virtual interactive object relative to the eye position of the second user and being smaller in response to the virtual interactive object being farther away from the eye position of the second user.

3. The method according to claim 1, wherein determining the movement trajectory, the first appearance state feature, and the second appearance state feature after the current moment includes:

determining a first color change feature of a first color of the virtual interactive object after the current moment in conjunction with the movement trajectory, the first color being a color that the virtual interactive object needs to present to the eye position of the first user and being lighter in response to the virtual interactive object being farther away from the eye position of the first user; and determining a second color change feature of a second color of the virtual interactive object after the current moment in conjunction with the movement trajectory, the second color being a color that the virtual interactive object needs to present to the eye position of the second user and being lighter in response to the virtual interactive object being farther away from the eye position of the second user.

4. The method according to claim 3, wherein the determining the first color change feature comprises applying a first color change rule as the virtual interactive object moves along the movement trajectory, and the determining the second color change feature comprises applying a second color change rule as the virtual interactive object moves along the movement trajectory.

5. The method according to claim 1, wherein a first diffraction grating is superimposed on the first display surface of the transparent holographic display screen, and a second diffraction grating is superimposed on the second display surface of the transparent holographic display screen;

the method further comprising:

controlling the second diffraction grating to block first image light corresponding to the virtual interactive object having the movement trajectory and the first appearance state feature to make the virtual interactive object having the movement trajectory and the first appearance state feature invisible on the second display surface; and controlling the first diffraction grating to block second image light corresponding to the virtual interactive object having the movement trajectory and the second appearance state feature to make the virtual interactive object having the movement trajectory and the second appearance state feature invisible on the first display surface.

6. The method according to claim 5, wherein:

displaying the virtual interactive object having the movement trajectory and the first appearance shape feature on the first display surface of the transparent holographic display screen includes projecting the virtual interactive object having the movement trajectory and the first appearance state feature on the first display surface of the transparent holographic display screen through at least one projection light source, the at least one projection light source being disposed inside the transparent holographic display screen or facing toward the transparent holographic display screen; and controlling the second diffraction grating to block the first image light corresponding to the virtual interactive object having the movement trajectory and the first appearance state feature includes sending an electrical control signal to the second diffraction grating, the electrical control signal being configured to control a sub-grating area, covered by the first image light, of the second diffraction grating to be in a light blocking state.

7. The method according to claim 5, wherein:

displaying the virtual interactive object having the movement trajectory and the second appearance state feature on the second display surface of the transparent holographic display screen includes projecting the virtual interactive object having the movement trajectory and the second appearance state feature on the second display surface of the transparent holographic display screen through at least one projection light source, the at least one projection light source being disposed inside the transparent holographic display screen or facing toward the transparent holographic display screen; and controlling the first diffraction grating to block the second image light corresponding to the virtual interactive object having the movement trajectory and the second appearance state feature include sending an electrical control signal to the first diffraction grating, the electrical control signal being configured to control a sub-grating area, covered by the second image light, of the first diffraction grating to be in a light blocking state.

8. The method according to claim 5, wherein the second diffraction grating has mechanically adjustable second grating spacing and the controlling the second diffraction grating comprises adjusting the second grating spacing in a first sub-grating area covered by the first image light until reaching a first light blocking state, and the first diffraction grating has mechanically adjustable first grating spacing and the controlling the first diffraction grating comprises adjusting the first grating spacing in a second sub-grating area covered by the second image light until reaching a second light blocking state.

9. An electronic device comprising:

a memory storing program instructions; and a processor configured to execute the program instructions to:

obtain an input operation by a first user on a virtual interactive object displayed on a first display surface of a transparent holographic display screen, the first user being located at a first display surface side of the transparent holographic display screen;

determine, in conjunction with the input operation, a movement trajectory of the virtual interactive object, a first appearance state feature of the virtual interactive object relative to an eye position of the first user, and a second appearance state feature of the virtual interactive object relative to an eye position of a second user, after a current moment, the second user being located at a second display surface side of the transparent holographic display screen, the movement trajectory being determined through combining a current movement speed and a current movement direction of the virtual interactive object, and a magnitude and a direction of a force of the input operation on the virtual interactive object, wherein a size change feature corresponding to an apparent size of the virtual interactive object is determined as the virtual interactive object moves along the movement trajectory based on a preconfigured correspondence relationship defining correspondences between a plurality of different apparent sizes of the virtual interactive object and a plurality of different distances of the virtual interactive object relative to a user's eyes, and the determining the size change feature comprises querying the preconfigured correspondence relationship using a distance between the virtual interactive object and the user's eyes;

display the virtual interactive object having the movement trajectory and the first appearance state feature on the first display surface of the transparent holographic display screen; and display the virtual interactive object having the movement trajectory and the second appearance state feature on a second display surface of the transparent holographic display screen.

10. The electronic device according to claim 9, wherein the processor is further configured to execute the program instructions stored in the memory to, when determining the movement trajectory, the first appearance state feature, and the second appearance state feature after the current moment:

determine the movement trajectory of the virtual interactive object after the current moment in conjunction with the input operation;

determine a first size change feature corresponding to a first size of the virtual interactive object after the current moment in conjunction with the movement trajectory, the first size being a size of the virtual interactive object relative to the eye position of the first user and being smaller in response to the virtual interactive object being farther away from the eye position of the first user; and determine a second size change feature corresponding to a second size of the virtual interactive object after the current moment in conjunction with the movement trajectory, the second size being a size of the virtual interactive object relative to the eye position of the second user and being smaller in response to the virtual interactive object being farther away from the eye position of the second user.

11. The electronic device according to claim 10, wherein when determining the movement trajectory, the first appearance state feature, and the second appearance state feature after the current moment, the processor is further configured to execute the program instructions stored in the memory to:

determine a first color change feature of a first color of the virtual interactive object after the current moment in conjunction with the movement trajectory, the first color being a color that the virtual interactive object needs to present to the eye position of the first user and being lighter in response to the virtual interactive object being farther away from the eye position of the first user; and determine a second color change feature of a second color of the virtual interactive object after the current moment in conjunction with the movement trajectory, the second color being a color that the virtual interactive object needs to present to the eye position of the second user and being lighter in response to the virtual interactive object being farther away from the eye position of the second user.

12. The electronic device according to claim 9, wherein a first diffraction grating is superimposed on the first display surface of the transparent holographic display screen, and a second diffraction grating is superimposed on the second display surface of the transparent holographic display screen;

the processor is further configured to execute the program instructions stored in the memory to:

control the second diffraction grating to block first image light corresponding to the virtual interactive object having the movement trajectory and the first appearance state feature to make the virtual interactive object having the movement trajectory and the first appearance state feature invisible on the second display surface; and control the first diffraction grating to block second image light corresponding to the virtual interactive object having the movement trajectory and the second appearance state feature to make the virtual interactive object having the movement trajectory and the second appearance state feature invisible on the first display surface.

13. The electronic device according to claim 12, wherein:

when displaying the virtual interactive object having the movement trajectory and the first appearance state feature on the first display surface of the transparent holographic display screen, the processor is further configured to execute the program instructions stored in the memory to: project the virtual interactive object having the movement trajectory and the first appearance state feature on the first display surface of the transparent holographic display screen through at least one projection light source, the at least one projection light source being disposed inside the transparent holographic display screen or facing toward the transparent holographic display screen; and when controlling the second diffraction grating to block the first image light corresponding to the virtual interactive object having the movement trajectory and the first appearance state feature, the processor is further configured to execute the program instructions stored in the memory to: send an electrical control signal to the second diffraction grating, the electrical control signal being configured to control a sub-grating area, covered by the first image light, of the second diffraction grating to be in a light blocking state.

14. The electronic device according to claim 12, wherein:

when displaying the virtual interactive object having the movement trajectory and the second appearance state feature on the second display surface of the transparent holographic display screen, the processor is further configured to execute the program instructions stored in the memory to: project the virtual interactive object having the movement trajectory and the second appearance state feature on the second display surface of the transparent holographic display screen through at least one projection light source, the at least one projection light source being disposed inside the transparent holographic display screen or facing toward the transparent holographic display screen; and when controlling the first diffraction grating to block the second image light corresponding to the virtual interactive object having the movement trajectory and the second appearance state feature, the processor is further configured to execute the program instructions stored in the memory to: send an electrical control signal to the first diffraction grating, the electrical control signal being configured to control a sub-grating area, covered by the second image light, of the first diffraction grating to be in a light blocking state.

* * * * *